(12) United States Patent
Dang et al.

(10) Patent No.: US 7,392,340 B1
(45) Date of Patent: Jun. 24, 2008

(54) DISK DRIVE EMPLOYING STREAM DETECTION ENGINE TO ENHANCE CACHE MANAGEMENT POLICY

(75) Inventors: Quoc Dang, Brea, CA (US); Joseph C. S. Liu, Rancho Santa Margarita, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 375 days.

(21) Appl. No.: 11/086,513

(22) Filed: Mar. 21, 2005

(51) Int. Cl.
G06F 12/00 (2006.01)

(52) U.S. Cl. .................. 711/111; 711/113; 711/137; 711/154; 711/156

(58) Field of Classification Search .................. 711/137, 711/154, 111, 113, 156
See application file for complete search history.

(56) References Cited

U.S. PATENT DOCUMENTS

| 6,092,149 | A | 7/2000 | Hicken et al. |
| 6,260,115 | B1 | 7/2001 | Permut et al. |
| 6,687,765 | B2 | 2/2004 | Surugucchi et al. |
| 6,779,053 | B2 * | 8/2004 | Ippolito et al. ................. 710/33 |
| 6,823,428 | B2 * | 11/2004 | Rodriguez et al. .......... 711/136 |
| 2003/0217230 | A1 | 11/2003 | Rodriguez et al. |
| 2006/0179239 | A1 * | 8/2006 | Fluhr et al. .................. 711/137 |

* cited by examiner

Primary Examiner—Jack Lane
(74) Attorney, Agent, or Firm—Brian E. Jones, Esq.; Howard H. Sheerin, Esq.

(57) ABSTRACT

A disk drive is disclosed comprising a disk, a head actuated over the disk, a host interface for receiving disk access commands from a host, a command queue for queuing the disk access commands, and a stream detection engine for evaluating the disk access commands to detect a plurality of streams accessed by the host. The stream detection engine maintains a stream data structure for each detected stream, wherein the stream data structure comprises a frequency counter for tracking a number of disk access commands associated with the stream out of a predetermined number of consecutive disk access commands received from the host. A disk controller selects one of the streams for servicing in response to the frequency counters.

33 Claims, 4 Drawing Sheets

DISK DRIVE EMPLOYING STREAM DETECTION ENGINE TO ENHANCE CACHE MANAGEMENT POLICY

BACKGROUND OF THE INVENTION

1. Field of the Invention

The present invention relates to disk drives. More particularly, the present invention relates to a disk drive employing a stream detection engine to enhance cache management policy.

2. Description of the Prior Art

Disk drives typically employ a cache system for caching data in semiconductor memory in order to minimize the access time of the disk drive. For example, the access time for read commands is reduced significantly if the read data is already cached in the semiconductor memory. This is because the access time of the semiconductor memory is much faster than the disk due to the mechanical latencies in actuating the head and rotating the disk. Similarly, caching write data for write commands reduces the access time from the host perspective since the write command is completed once the write data has been transferred and stored in the semiconductor memory. The host can transmit additional access commands to the disk drive while the disk drive writes the cached data to the disk.

A further reduction in access time is attained through "predictive caching" wherein additional data sectors preceding and/or following a current read command are cached in anticipation that the host will eventually request these data sectors in subsequent read commands. This is particularly true in applications where data is processed in streams (such as video applications) where there is a high probability that a number of consecutive data sectors will be requested by the host through multiple read commands. Since the cache memory is extremely small compared to the capacity of the disk, a significant effort is made to efficiently manage the cache memory to prevent overflow while retaining the data sectors having the highest cache hit probability. A simple cache management policy de-allocates data sectors from cache based on aging, wherein the oldest or least recently used (LRU) data sectors are de-allocated first since they are least likely to be requested by the host.

U.S. patent application Ser. No. 10/150,172 (Pub. No. 2003/0217230) discloses a more sophisticated cache management policy that identifies and "traces" streams accessed by the host. As new host requests are received causing new data sectors to be cached for a particular stream, the LRU data sectors for that stream are de-allocated from the cache rather than indiscriminately de-allocating LRU data sectors from the cache. Although the stream tracer may improve the de-allocation policy of cache management, it provides only a limited amount of information for enhancing the cache policy firmware.

U.S. Pat. No. 6,260,115 discloses a technique for tracing streams that provides additional information which further enhances cache management. For example, each stream data structure includes a count indicating the number of sequential accesses made by the host. If the count exceeds a threshold, indicating the stream is "very sequential", the read-ahead prediction value (prestage) for the stream is increased so that more data sectors following a current read command are cached, thereby improving the probability of cache hits for very sequential streams. Although tracking the number of sequential accesses in order to adjust the size of the read-ahead prediction value for a particular stream may improve the probability of cache hits, further improvements to cache management are desirable.

There is, therefore, a need to improve cache management in a disk drive when multiple streams are accessed by a host.

SUMMARY OF THE INVENTION

The present invention may be regarded as a disk drive comprising a disk, a head actuated over the disk, a host interface for receiving disk access commands from a host, a command queue for queuing the disk access commands, and a stream detection engine for evaluating the disk access commands to detect a plurality of streams accessed by the host. The stream detection engine for maintaining a stream data structure for each detected stream, wherein the stream data structure comprises a frequency counter for tracking a number of disk access commands associated with the stream out of a predetermined number of consecutive disk access commands received from the host. A disk controller selects one of the streams for servicing in response to the frequency counters.

In one embodiment, the disk controller selects the stream for servicing having the largest frequency counter.

In another embodiment, the stream data structure further comprises an age counter for tracking the number of consecutive disk access commands received from the host that are not associated with the corresponding stream. In one embodiment, the disk controller selects the stream for servicing in response to the frequency counters and the age counters.

In yet another embodiment, the disk drive further comprises a cache memory, wherein the disk controller allocates a circular buffer out of the cache memory for each stream detected by the stream detection engine. In one embodiment, the disk controller dynamically adjusts the size of the circular buffer for one of the streams in response to the frequency counter, and in another embodiment, the disk controller dynamically adjusts the size of each circular buffer in response to the age counter for each stream. In yet another embodiment, the disk controller de-allocates one of the streams and the associated circular buffer in response to the age counter for the stream. In still another embodiment, the disk controller selects one of the streams for servicing in response to a state of the circular buffers.

In yet another embodiment, the disk controller computes a read-ahead value for reading and storing in the circular buffer a number of data sectors following a read command associated with one of the streams, wherein the read-ahead value is computed in response to the frequency counter. For example, in one embodiment the disk controller increases the read-ahead value for larger frequency counter values.

The present invention may also be regarded as a method of processing disk access commands in a disk drive received from a host computer, wherein the disk drive comprises a disk, a head actuated over the disk, a host interface for receiving the disk access commands from the host, a command queue for queuing the disk access commands, and a stream detection engine for evaluating the disk access commands to detect a plurality of streams accessed by the host. A stream data structure is maintained for each detected stream, wherein the stream data structure comprises a frequency counter for tracking a number of disk access commands associated with the stream out of a predetermined number of consecutive disk access commands received from the host. One of the streams is selected for servicing in response to the frequency counters.

The present invention may also be regarded as disk drive circuitry for use in a disk drive comprising a disk, and a head actuated over the disk. The disk drive circuitry comprises a host interface for receiving disk access commands from a host, a command queue for queuing the disk access commands, and a stream detection engine for evaluating the disk access commands to detect a plurality of streams accessed by the host. The stream detection engine for maintaining a stream data structure for each detected stream, wherein the stream data structure comprises a frequency counter for tracking a number of disk access commands associated with the stream out of a predetermined number of consecutive disk access commands received from the host. A disk controller selects one of the streams for servicing in response to the frequency counters.

DESCRIPTION OF THE PREFERRED EMBODIMENTS

Figure 1:
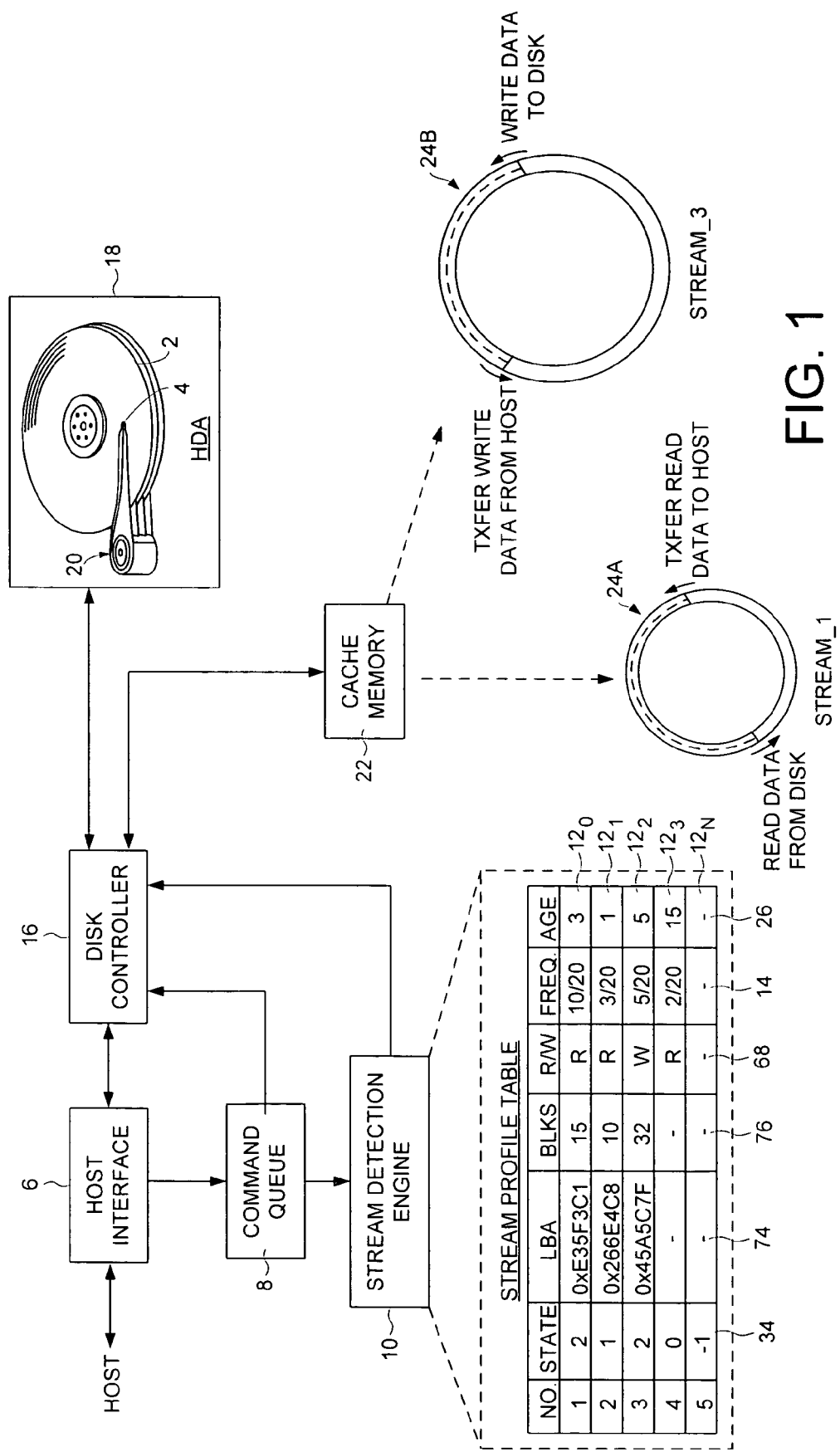
FIG. 1 shows a disk drive according to an embodiment of the present invention comprising a command queue for storing disk access commands received from a host, and a stream detection engine for evaluating the disk access commands to detect a plurality of streams accessed by the host, wherein a circular buffer is allocated in a cache memory for each stream detected by the stream detection engine.

FIG. 1 shows a disk drive comprising a disk 2, a head 4 actuated over the disk 2, a host interface 6 for receiving disk access commands from a host, a command queue 8 for queuing the disk access commands, and a stream detection engine 10 for evaluating the disk access commands to detect a plurality of streams accessed by the host. The stream detection engine 10 for maintaining a stream data structure $12_0$-$12_N$ for each detected stream, wherein the stream data structure comprising a frequency counter 14 for tracking a number of disk access commands associated with the stream out of a predetermined number of consecutive disk access commands received from the host. A disk controller 16 selects one of the streams for servicing in response to the frequency counters 14.

In the embodiment of FIG. 1, the disk 2 and the head 4 are enclosed in a head disk assembly (HDA) 18 wherein the head 2 is attached to a distal end of an actuator arm which rotated about a pivot by a voice coil motor (VCM) 20 in order to actuate the head 4 radially over the disk 2. The HDA 18 may comprise a single disk/head interface, or multiple disks having respective top and bottom heads. Each disk 2 comprises a plurality of radially spaced, concentric data tracks, wherein each data track is partitioned into a number of data sectors. The disk commands received from the host comprise a logical block address (LBA) which indirectly identifies one of the data sectors for read/write operations. The disk controller maps each LBA into a physical block address (PBA) representing one of the data sectors on the disk 2. The LBA to PBA mapping facilitates the re-mapping of defective data sectors to spare data sectors which may occur during manufacturing or while the disk drive is in the field.

The disk drive in the embodiment of FIG. 1 further comprises a cache memory 22 which decreases the average access time for both write and read operations. For write operations, the cache memory 22 provides a staging area for the write data which allows the disk drive to receive additional disk access commands from the host rather than wait until the write data is written to the disk 2. For read operations, the cache memory 22 provides both a staging area for read data, as well as a redundant storage area that can be accessed much faster than the disk 2 by avoiding the mechanical latencies in actuating the head 4 and rotating the disk 2. The access time is further reduced through predictive caching wherein data sectors preceding and following a read command may be stored in the cache memory 22 in anticipation that these data sectors will also be requested by the host.

In one embodiment, when the stream detection engine 10 detects a new stream, the disk controller 16 allocates a circular buffer in the cache memory 22 for the new stream. Allocating a circular buffer for each stream improves cache management by reusing memory space in a circular manner as well as de-allocating memory more intelligently which improves the cache hit probability. Allocating and de-allocating circular buffers as streams come in and go out of view also helps reduce fragmentation of the cache memory.

FIG. 1 shows an example state of the cache memory 22 comprising a circular buffer 24A for servicing a read stream and a circular buffer 24B for servicing a write stream. When servicing the read stream, data read from the disk is stored at the head of the circular buffer 24A while data at the end of the circular buffer 24A is transferred to the host. In some applications, such as database applications, a stream is accessed in both a forward and reverse direction which means that data may be transmitted to the host from anywhere within the circular buffer 24A, wherein the probability of a cache hit is determined by the size of the circular buffer 24A. Once the circular buffer 24A has been filled with read data, new read data replaces the oldest cached data in a circular manner.

When servicing the write stream, write data received from the host is stored at the head of the circular buffer 24B where it is staged until the disk drive is ready to write the staged write data to the disk. As the write data is written to the disk from the end of the circular buffer, the end pointer is updated thereby freeing memory for re-use by subsequent write data received from the host.

A circular buffer remains allocated as long as the respective stream is considered active, and de-allocated when the stream is deemed inactive. In one embodiment, the stream data structure 12 includes an age counter 26 for tracking the number of consecutive disk access commands received from the host that are not associated with the corresponding stream. In one embodiment, a stream is deemed inactive and it's corresponding circular buffer de-allocated when the age counter 26 exceeds a predetermined threshold.

Figure 2:
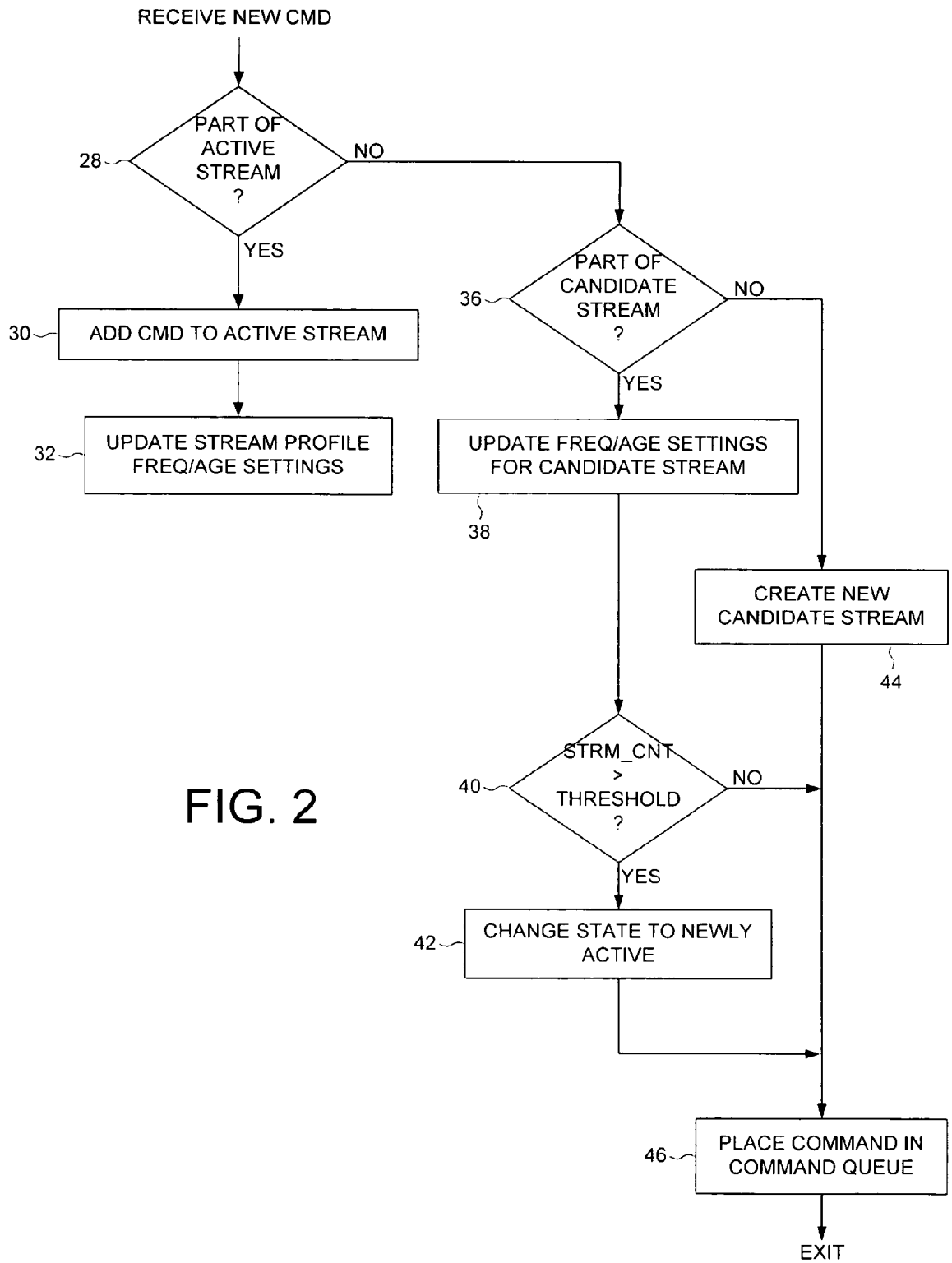
FIG. 2 is a flow diagram according to an embodiment of the present invention illustrating operation of the stream detection engine which maintains candidate streams which mature into actual streams if the number of sequential or near sequential disk access commands exceeds a predetermined threshold.

FIG. 2 shows a flow diagram according to an embodiment of the present invention illustrating operation of the stream detection engine 10. When a new disk access command is received from the host, at step 28 it is evaluated by the stream detection engine 10 to determine whether the command is associated with an active stream. In one embodiment, the stream detection engine 10 evaluates the LBA of the disk access command to determine whether it is a sequential access or a near sequential access of an active stream. If so, then at step 30 the stream detection engine 10 adds the disk access command to the active stream, and at step 32 the stream detection engine 10 updates the frequency counter 14 and the age counter 26 for the corresponding stream data structure 12 in the stream profile table.

In the embodiment of FIG. 1, the stream data structure 12 includes a state variable 34 which indicates the state of the associated stream. In the example shown, a state of −1 indicates that the stream data structure is not associated with any stream, a state of 0 indicates the stream data structure is associated with a candidate stream, a state of 1 indicates the stream data structure is associated with a newly active stream, and a state of 2 indicates the stream data structure is associated with an active stream. A candidate stream is a stream that has at least one associated disk access command, but not enough disk access commands (or consecutive or near consecutive LBAs) to be considered an active stream. If the number of disk access commands (or consecutive or near consecutive LBAs) exceeds a predetermined threshold, the stream is considered active and the state 34 is changed from 0 to 1.

Referring again to the flow diagram of FIG. 2, if at step 28 the disk access command is not associated with an active stream, then at step 36 the stream detection engine 10 determines whether the disk access command is associated with a candidate stream. If so, at step 38 the stream detection engine 10 updates the frequency counter 14 and the age counter 26 in the corresponding stream data structure 12. At step 40 the stream detection engine compares a stream counter (e.g., the frequency counter 14 or an LBA counter) to a predetermined threshold to determine whether a candidate stream should be converted into an newly active stream. If so, at step 42 the stream detection engine 10 changes the state 34 variable in the stream data structure to newly active. If at step 36 the disk access command is not associated with a candidate stream, then at step 44 the stream detection engine 10 creates a new stream data structure 12, initializes the state 34 to candidate, and associates the disk access command with the new candidate stream. At step 46, the disk access command is placed in the command queue 8 for servicing by the disk controller 16.

Figure 3A:
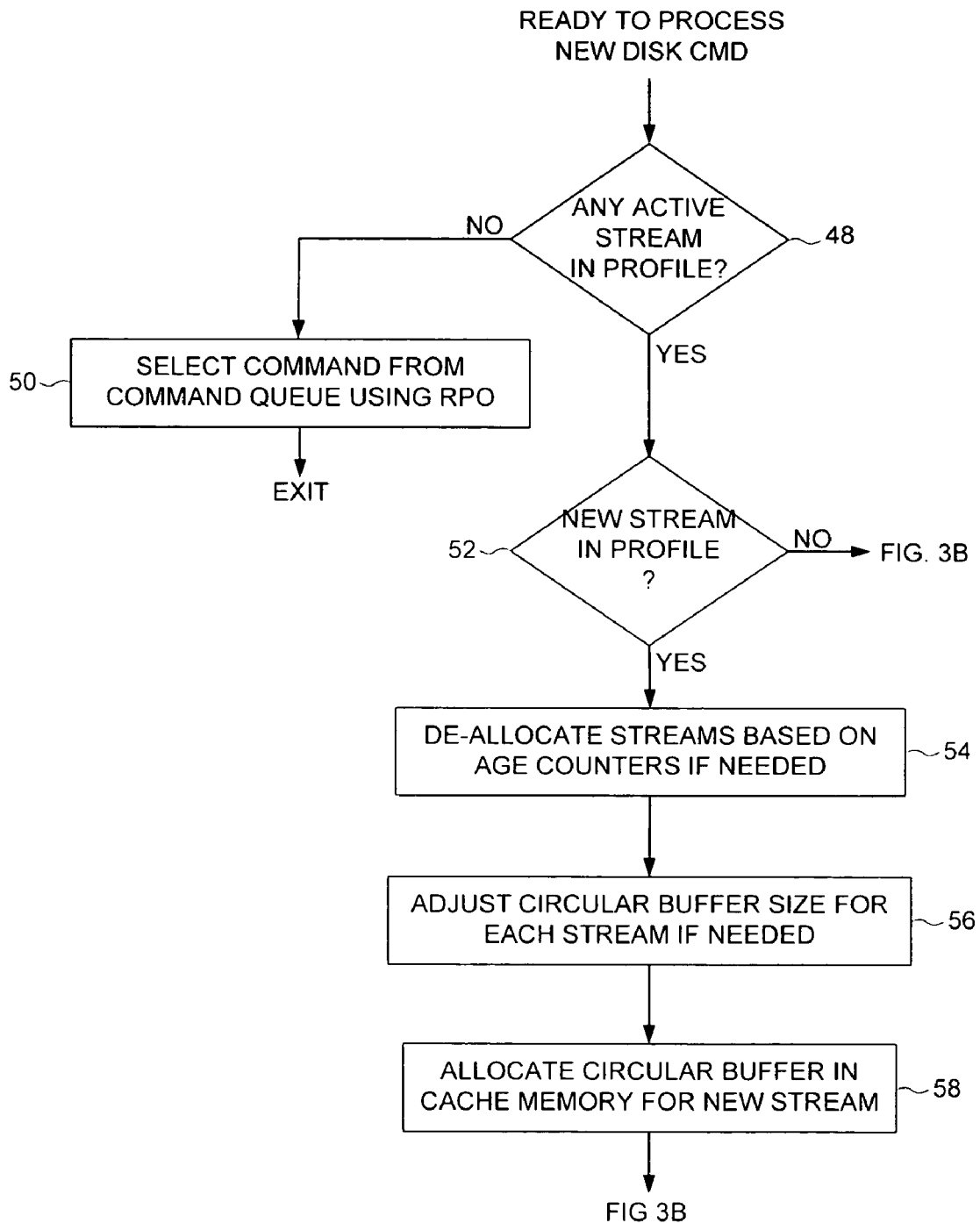
FIG. 3A is a flow diagram according to an embodiment of the present invention illustrating the allocation of a circular buffer in a cache memory for each new stream detected by the stream detection engine.

FIG. 3A is a flow diagram illustrating how the disk controller 16 selects a command from the command queue 8 to service by evaluating the stream data structures $12_0$-$12_N$ in the stream profile table. At step 48 the disk controller 16 evaluates the state 34 of each stream data structure to determine whether there are any newly active (1) or active (2) streams. If not, at step 50 the disk controller 16 selects a disk access command from the command queue 8 for servicing according to a rotational position optimization (RPO) algorithm. If at step 52 the state 34 indicates there is a newly active (1) stream in the stream profile table, then at step 54 the disk controller 16 de-allocates the circular buffer of streams that are deemed inactive (e.g., the age counter 26 exceeds a predetermined threshold) and at step 56 adjusts the size of the circular buffers for the remaining active streams in order free cache memory for the newly active stream (if necessary). For example, the size of the circular buffer is reduced for streams having a frequency counter 14 which has decreased below a predetermined threshold. At step 58 the disk controller allocates a circular buffer in the cache memory 22 for the newly active stream. In one embodiment, the disk controller 16 evaluates the disk access command associated with the newly active stream, and particularly the number of data sectors associated with the disk access command to determine an appropriate initial size for the circular buffer.

Figure 3B:
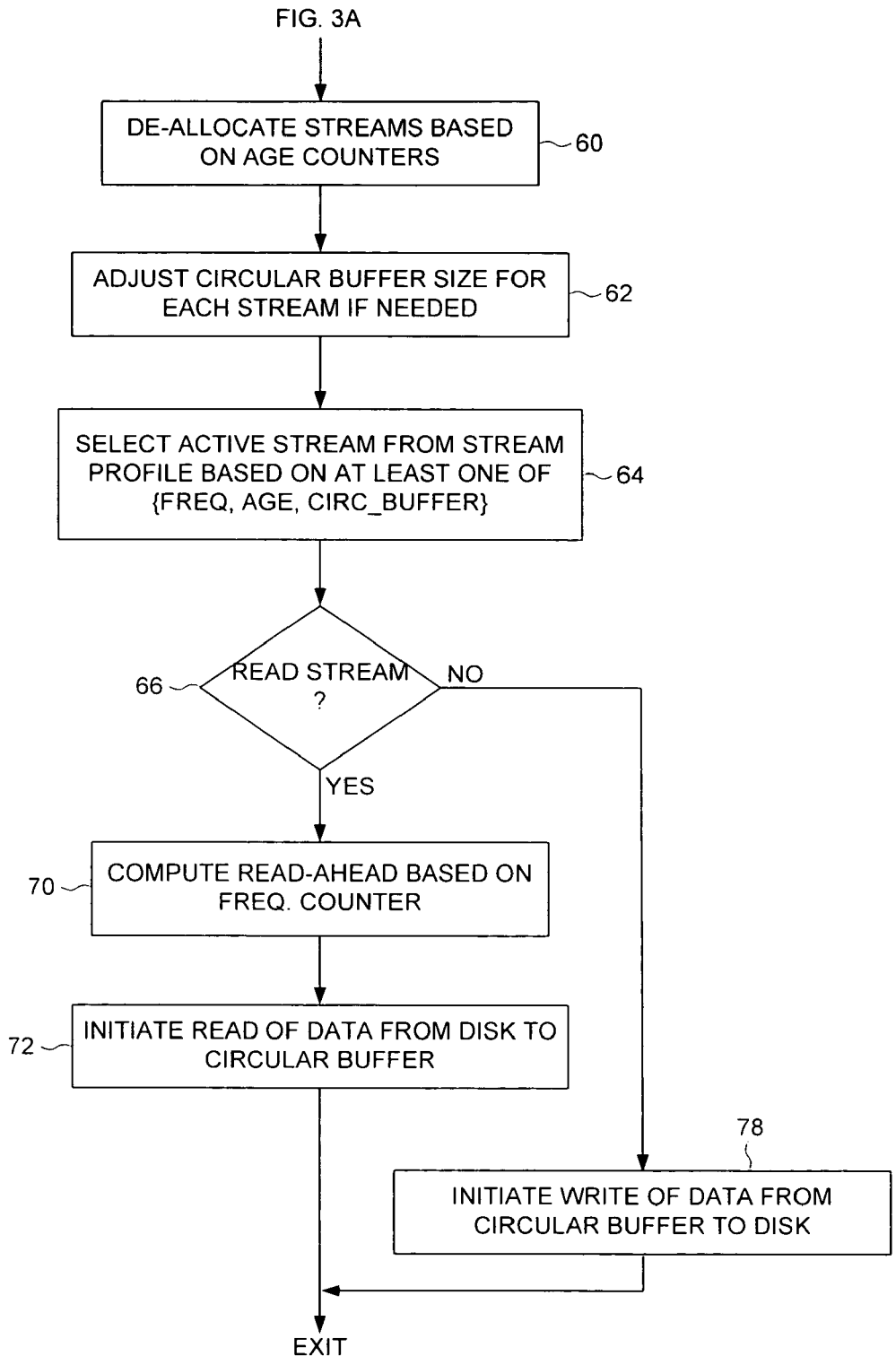
FIG. 3B is a flow diagram according to an embodiment of the present invention illustrating cache management by de-allocating old streams and adjusting the size of the circular buffers, as well as selecting a next stream to service by evaluating the state of the streams, such as the frequency counter, age counter, or state of the circular buffers.

If at step 52 the state 34 indicates there are no newly active (1) streams in the stream profile table, control continues to the flow diagram of FIG. 3B wherein at step 60 the disk controller 16 de-allocates the circular buffers for streams that are deemed inactive (e.g., the age counter 26 exceeds a predetermined threshold) and at step 62 adjusts the size of the circular buffers for the remaining active streams. In one embodiment, the disk controller 16 increases the size of the circular buffer for more active streams (high frequency counter 14) and decreases the size of the circular buffer for less active streams (low frequency counter 14). De-allocating the circular buffers for inactive streams and decreasing the size of circular buffers for less active streams provides a more intelligent de-allocation policy which increases the probability of cache hits by allocating more cache memory to the more active streams.

At step 64 of FIG. 3B, the disk controller 16 selects an active stream for servicing by evaluating at least one of the frequency counters 14, the age counters 26, and the state of the circular buffers. For example, the disk controller 16 may select the most active stream for servicing (the stream having the highest frequency counter 14), or the newest stream for processing (the stream having the lowest age counter 26), or by computing a priority value in response to both the frequency counters 14 and age counters 26. The disk controller 16 may also take into account the state of the circular buffers, for example, selecting the write stream having a full or near full circular buffer in order to free cache memory for storing additional write data received from the host in connection with subsequent disk access commands.

If at step 66 the stream selected by the disk controller 16 is a read stream (as determined by a R/W state 68 (FIG. 1) in the stream data structure 12), then at step 70 the disk controller 16 computes a "read-ahead" value for the stream which specifies the number of data sectors to read following the end of the current read command. In one embodiment, the disk controller 16 computes the read-ahead in response to the frequency counter 14, for example, by increasing the read-ahead for larger frequency counter values. In this manner, more data sectors are cached for more active streams which increases the probability of a cache hit when processing subsequent disk access commands. At step 72 the disk controller 16 initiates reading of data from the disk into the circular buffer for the selected stream. In the embodiment of FIG. 1, the stream data structure 12 comprises an LBA 74 and a number of data sectors 76 to read/write for the current disk access command. If at step 66 the selected stream is a write stream, at step 78 the disk controller 16 initiates writing the write data staged in the circular buffer to the disk, wherein the LBA 74 and number of data sectors 76 to write are specified in the stream data structure 12.

In one embodiment, the disk controller 16 selects the corresponding disk access command from the command queue 8 that corresponds to the LBA 74 in the stream data structure 12 that was selected for servicing at step 64. In this manner, the disk access command is removed from the command queue 8 so that it is not reprocessed by the disk controller 16. Also in this embodiment the stream detection engine 10 updates the stream data structures $12_0$-$12_N$ to reflect the most recent disk access command associated with each active stream. Thus, in this embodiment disk access commands for any particular stream may be serviced out of order wherein a most recent disk access command is processed before an older disk access command still queued in the command queue 8. In an alternative embodiment, the stream detection engine 10 concatenates disk access commands associated with each stream such that the LBA 74 and number of data sectors 76 in each stream data structure 12 reflects the concatenation of all disk access commands queued in the command queue 8 for the corresponding stream.

In one embodiment, the disk controller 16 comprises a microprocessor for executing firmware that controls operation of the disk drive, including the cache management policy. The stream detection facility is off-loaded from the microprocessor to the stream detection engine 10 which is preferably implemented in hardware for speed and efficiency. In addition, the stream detection engine 10 may maintain and utilize various private variables for each stream data structure 12 that are not accessible by the disk controller 16. For example, the stream detection engine may maintain an LBA counter representing the number of consecutive or near consecutive LBAs associated with a corresponding stream. The stream may be converted from a candidate stream to a newly active stream at step 40 of FIG. 2 if the LBA counter exceeds a predetermined threshold.

We claim:

1. A disk drive comprising:
   (a) a disk;
   (b) a head actuated over the disk;
   (c) a host interface for receiving disk access commands from a host;
   (d) a command queue for queuing the disk access commands;
   (e) a stream detection engine for evaluating the disk access commands to detect a plurality of streams accessed by the host, wherein:
       the stream detection engine for maintaining a stream data structure for each detected stream; and
       the stream data structure comprising a frequency counter for tracking a number of disk access commands associated with the stream out of a predetermined number of consecutive disk access commands received from the host; and
   (f) a disk controller for selecting one of the streams for servicing in response to the frequency counters.

2. The disk drive as recited in claim 1, wherein the disk controller selects the stream for servicing having the largest frequency counter.

3. The disk drive as recited in claim 1, wherein the stream data structure further comprises an age counter for tracking the number of consecutive disk access commands received from the host that are not associated with the corresponding stream.

4. The disk drive as recited in claim 3, wherein the disk controller selects the stream for servicing in response to the frequency counters and the age counters.

5. The disk drive as recited in claim 3, further comprising a cache memory, wherein:
   (a) the disk controller allocates a circular buffer out of the cache memory for each stream detected by the stream detection engine; and
   (b) the disk controller dynamically adjusts the size of each circular buffer in response to the age counter for each stream.

6. The disk drive as recited in claim 5, wherein the disk controller de-allocates one of the streams and the associated circular buffer in response to the age counter for the stream.

7. The disk drive as recited in claim 1, further comprising a cache memory, wherein the disk controller allocates a circular buffer out of the cache memory for each stream detected by the stream detection engine.

8. The disk drive as recited in claim 7, wherein the disk controller dynamically adjusts the size of the circular buffer for one of the streams in response to the frequency counter.

9. The disk drive as recited in claim 7, wherein the disk controller selects one of the streams for servicing in response to a state of the circular buffers.

10. The disk drive as recited in claim 7, wherein:
    (a) the disk controller computes a read-ahead value for reading and storing in the circular buffer a number of data sectors following a read command associated with one of the streams; and
    (b) the read-ahead value is computed in response to the frequency counter.

11. The disk drive as recited in claim 10, wherein the disk controller increases the read-ahead value for larger frequency counter values.

12. A method of processing disk access commands in a disk drive received from a host computer, the disk drive comprising a disk, a head actuated over the disk, a host interface for receiving the disk access commands from the host, a command queue for queuing the disk access commands, and a stream detection engine for evaluating the disk access commands to detect a plurality of streams accessed by the host, the method comprising the steps of:
    (a) maintaining a stream data structure for each detected stream, wherein the stream data structure comprising a frequency counter for tracking a number of disk access commands associated with the stream out of a predetermined number of consecutive disk access commands received from the host; and
    (b) selecting one of the streams for servicing in response to the frequency counters.

13. The method as recited in claim 12, the stream selected for servicing comprises the largest frequency counter.

14. The method as recited in claim 12, wherein the stream data structure further comprises an age counter for tracking the number of consecutive disk access commands received from the host that are not associated with the corresponding stream.

15. The method as recited in claim 14, wherein the stream is selected for servicing in response to the frequency counters and the age counters.

16. The method as recited in claim 14, wherein the disk drive further comprises a cache memory, further comprising the steps of:
    (a) allocating a circular buffer out of the cache memory for each stream detected by the stream detection engine; and
    (b) the disk controller dynamically adjusts the size of each circular buffer in response to the age counter for each stream.

17. The method as recited in claim 16, further comprising the step of de-allocating one of the streams and the associated circular buffer in response to the age counter for the stream.

18. The method as recited in claim 12, wherein the disk drive further comprises a cache memory, further comprising the step of allocating a circular buffer out of the cache memory for each stream detected by the stream detection engine.

19. The method as recited in claim 18, further comprising the step of dynamically adjusting the size of the circular buffer for one of the streams in response to the frequency counter.

20. The method as recited in claim 18, wherein the stream is selected for servicing in response to a state of the circular buffers.

21. The method as recited in claim 18, further comprising the step of computing a read-ahead value for reading and storing in the circular buffer a number of data sectors following a read command associated with one of the streams, wherein the read-ahead value is computed in response to the frequency counter.

22. The method as recited in claim 21, further comprising the step of increasing the read-ahead value for larger frequency counter values.

23. Disk drive circuitry for use in a disk drive comprising a disk, and a head actuated over the disk, the disk drive circuitry comprising:
- (a) a host interface for receiving disk access commands from a host;
- (b) a command queue for queuing the disk access commands;
- (c) a stream detection engine for evaluating the disk access commands to detect a plurality of streams accessed by the host, wherein:
  - the stream detection engine for maintaining a stream data structure for each detected stream;
  - the stream data structure comprising a frequency counter for tracking a number of disk access commands associated with the stream out of a predetermined number of consecutive disk access commands received from the host; and
- (d) a disk controller for selecting one of the streams for servicing in response to the frequency counters.

24. The disk drive circuitry as recited in claim 23, wherein the disk controller selects the stream for servicing having the largest frequency counter.

25. The disk drive circuitry as recited in claim 23, wherein the stream data structure further comprises an age counter for tracking the number of consecutive disk access commands received from the host that are not associated with the corresponding stream.

26. The disk drive circuitry as recited in claim 25, wherein the disk controller selects the stream for servicing in response to the frequency counters and the age counters.

27. The disk drive circuitry as recited in claim 25, further comprising a cache memory, wherein:
- (a) the disk controller allocates a circular buffer out of the cache memory for each stream detected by the stream detection engine; and
- (b) the disk controller dynamically adjusts the size of each circular buffer in response to the age counter for each stream.

28. The disk drive circuitry as recited in claim 27, wherein the disk controller de-allocates one of the streams and the associated circular buffer in response to the age counter for the stream.

29. The disk drive circuitry as recited in claim 23, further comprising a cache memory, wherein the disk controller allocates a circular buffer out of the cache memory for each stream detected by the stream detection engine.

30. The disk drive circuitry as recited in claim 29, wherein the disk controller dynamically adjusts the size of the circular buffer for one of the streams in response to the frequency counter.

31. The disk drive circuitry as recited in claim 29, wherein the disk controller selects one of the streams for servicing in response to a state of the circular buffers.

32. The disk drive circuitry as recited in claim 29, wherein:
- (a) the disk controller computes a read-ahead value for reading and storing in the circular buffer a number of data sectors following a read command associated with one of the streams; and
- (b) the read-ahead value is computed in response to the frequency counter.

33. The disk drive circuitry as recited in claim 32, wherein the disk controller increases the read-ahead value for larger frequency counter values.

* * * * *